Dec. 15, 1942.   J. W. LEIGHTON   2,305,174
INDEPENDENT WHEEL SUSPENSION
Original Filed Feb. 14, 1940
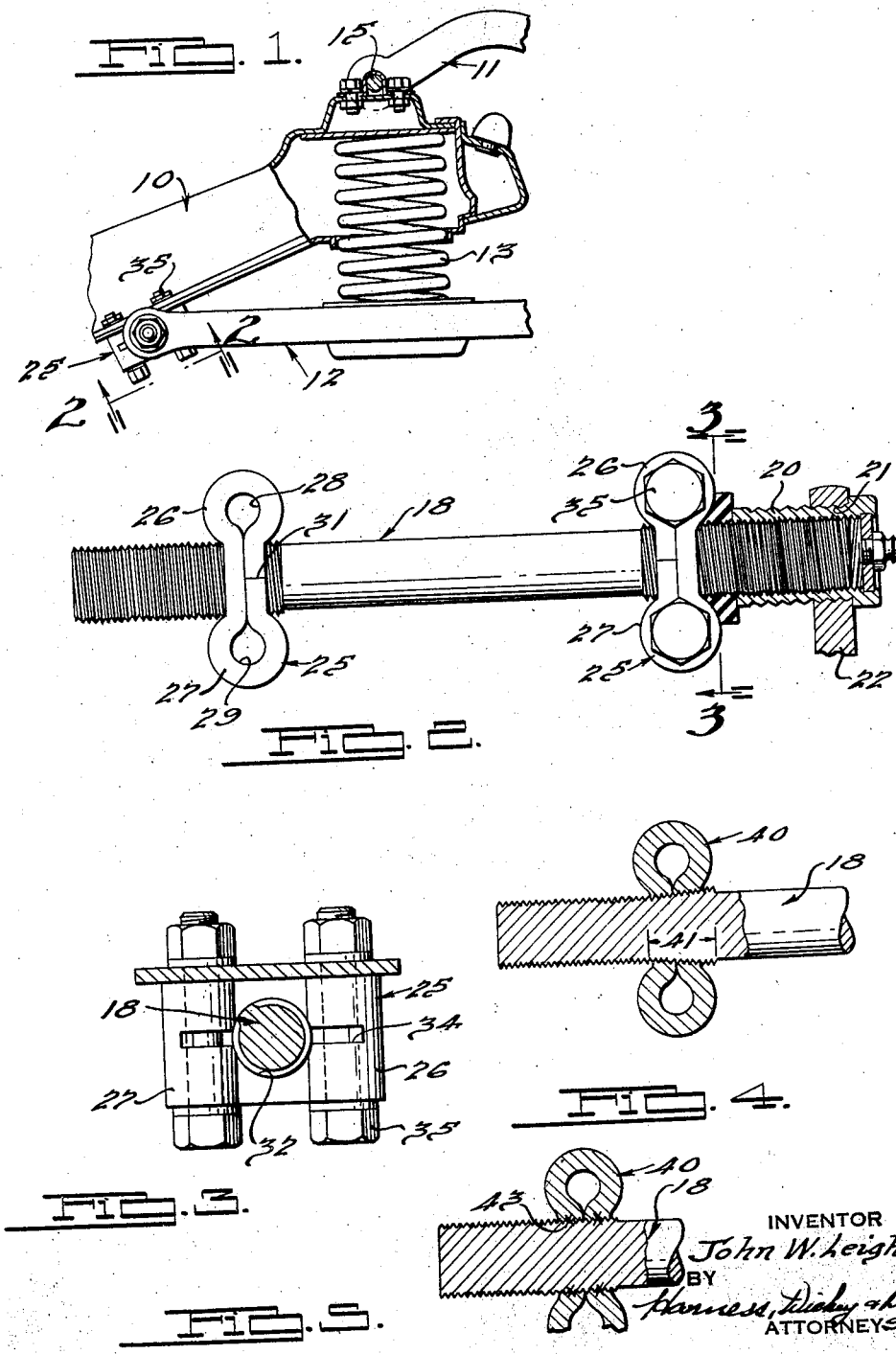
INVENTOR
John W. Leighton
BY
ATTORNEYS Patented Dec. 15, 1942

2,305,174

UNITED STATES PATENT OFFICE 2,305,174

INDEPENDENT WHEEL SUSPENSION

John W. Leighton, Port Huron, Mich.

Original application February 14, 1940, Serial No. 318,919. Divided and this application November 4, 1940, Serial No. 364,193

4 Claims. (Cl. 267—20)

The invention relates to motor vehicles, and it has particular relation to individual wheel suspensions.

Generally, at the present time, individual wheel suspensions include upper and lower arms pivotally connected at their inner ends to the vehicle frame and at their outer ends to a wheel supporting member. A spring is interposed between the frame and one of the arms for resiliently supporting the frame, and a shock absorber ordinarily is employed for conventional reasons.

The present invention is concerned principally with the means for pivotally or hingedly connecting the inner ends of the arm to the vehicle frame, and with methods of manufacture and assembly of such means with the purpose in mind of lowering costs of production and lowering costs of assembly while still obtaining an efficient and durable arrangement. The invention constitutes a division of my co-pending application for patent, Serial No. 318,919, filed February 14, 1940.

One object of the invention is to provide improved means for pivotally connecting arms of wheel suspensions to the vehicle frame, to the end that a satisfactory and low cost construction will be obtained.

Another object of the invention is to provide a novel and efficient method for manufacturing an attachable bar adapted to connect the wheel suspension arms to the vehicle frame.

And in general, it is an object of the invention to provide improvements relating to the pivotal anchoring of wheel suspension arms on vehicle frames, to the end that the suspension will be improved and the cost thereof will be reduced.

Other objects of the invention will become apparent from the following specification, from the drawing relating thereto, and from the claims hereinafter set forth.

For a better understanding of the invention, reference may be had to the drawing, wherein:

Figure 1 is a fragmentary, elevational view, partially broken away, of an individual wheel suspension embodying one form of the present invention;

Fig. 2 is a cross-sectional view on a larger scale taken substantially along the line 2—2 of Fig. 1, with certain parts removed for the purposes of illustration;

Fig. 3 is a cross-sectional view taken substantially along line 3—3 of Fig. 2;

Fig. 4 is a fragmentary, cross-sectional view illustrating another form of the invention; and Fig. 5 is a fragmentary, cross-sectional view illustrating still another form of the invention.

Referring to Fig. 1, the vehicle frame is indicated at 10 and the individual wheel suspension illustrated comprises in general an upper wishbone arm 11 and a longer and wider lower wishbone arm 12. A wheel supporting arm, not shown, extends vertically between the outer ends of the arms 11 and 12 and is pivotally connected to such arms so that the frame may move upwardly and downwardly relative to the wheel, during which action, the arms serve as pivotal links. A coil spring 13, resting on the lower arm 12, resiliently supports the frame.

For pivotally connecting the upper arm 11 to the frame, a bar 15 is provided which is secured to the frame by brackets, all as more particularly described and illustrated in the aforementioned copending application for patent. The lower wishbone has its inner ends respectively and pivotally mounted on the threaded ends of a bar 18. For effecting this result, a bushing 20 is threaded into an aperture 21 in each arm 22 of the wishbone 12 in such manner that the bushing turns with the arm and, in turn, each bushing is threaded onto one threaded end of the bar, although the arm and bushing are shown in Fig. 2 only on one end of the bar.

For connecting the bar to the frame 10, each threaded end of the bar has an anchoring strap 25 thereon which comprises a strip of metal folded to provide loops 26 and 27 that form openings 28 and 29 for receiving bolts adapted to anchor the straps to the frame. Between the folded ends of the straps, the metal is brought together in flat contacting relation and the ends of the strap may be welded at the line indicated at 31. The flat contacting intermediate parts of the strap are apertured as indicated at 32 in Fig. 3 and such aperture is threaded so that the strap may be threaded upon the threaded end of the bar.

A slot 34 projecting laterally from each side of the aperture 32 and intersecting the bolt receiving opening at such side, provides a means for allowing the strap to be pinched into binding engagement with the threaded end of the bar when the bolts are tightened on the frame. These bolts are indicated at 35, and it will be appreciated that when the bolts are tightened, the slotted portions will allow flexing or bending of the metal into tight binding engagement with the threads, from which it follows that the bar will not turn on the frame.

In the structure shown by Fig. 4, a strap 40 similar to strap 25 is positively locked to the threaded end of the pivot bar by providing an inner thread 41 on the bar which gradually increases in diameter, from which it follows that when the strap is threaded to the inner end of the threaded part of the bar, it becomes tightly locked in place due to the increasing diameter of the threads on the bar. It will be understood that when threading the strap into its final position, some force is employed so that the strap will not loosen during use of the suspension. It will be appreciated that a slot 34 such as shown in Fig. 3 need not be used in the strap shown by Fig. 4.

The structure shown by Fig. 5 is like that shown by Fig. 4, excepting that the straps are welded to the inner threaded ends of the bar as indicated at 43. In this case, the threaded diameter is not enlarged so that free turning of the bracket to the inner end of the threads may be effected.

Although more than one form of the invention has been illustrated and described in detail, it will be apparent to those skilled in the art that various modifications may be made without departing from the scope of the appended claims.

What is claimed is:

1. In combination a support, a bar, and means for securing said bar to said support comprising a strap-like sheet metal member having its ends folded inwardly into abutment with each other and forming a pair of loops defining parallel openings at the points of fold, an opening through said member intermediate said loops and extending at substantially right angles to the plane containing the axes of said loop openings, a slot extending substantially perpendicular to the axes of said loop openings and intersecting said intermediate opening and at least one of said loop openings, said bar being positioned in said intermediate opening, and a pair of bolts extending through said loop openings and through said support for holding one edge of said member against said support.

2. In combination, a support, a bar, and means for securing said bar to said support comprising a strap-like sheet metal member having its ends folded to form a pair of loops defining parallel openings at the points of fold which are adapted to receive fastening bolts, an opening through said member intermediate said loops and extending at substantially right angles to the plane containing the axes of said openings, said bar being positioned in said intermediate opening, and means for rigidly securing the sheet metal member to the bar so that the bar will not turn relative to the member when the latter is fastened to the support.

3. In combination, a support, a bar having a threaded portion, and means for securing the bar to the support comprising a strap-like sheet metal member having its ends folded to form a pair of loops defining parallel openings at the points of fold which are adapted to receive fastening bolts, a threaded opening through said member intermediate said loops and extending at substantially right angles to the plane containing the axes of said openings, said threaded portion of the bar being threaded into said threaded aperture and the thread surfaces of the bar and in the aperture being surface welded so as to rigidly secure the bar and member against relative turning.

4. In combination, a support, a bar having a threaded portion, and means for securing the bar to the support comprising a strap-like sheet metal member having its ends folded to form a pair of loops defining parallel openings at the points of fold which are adapted to receive fastening bolts, a threaded opening through said member intermediate said loops and extending at substantially right angles to the plane containing the axes of said openings, said threaded portion of the bar being tapered and so threaded into the threaded aperture that a jam fit is obtained owing to the taper, whereby the bar and member are secured against relative turning.

JOHN W. LEIGHTON.